(12) United States Patent
Xie

(10) Patent No.: US 10,362,292 B2
(45) Date of Patent: *Jul. 23, 2019

(54) SYSTEM AND METHOD FOR THREE DIMENSIONAL IMAGING

(71) Applicant: Hongyuan Xie, Shenzhen (CN)

(72) Inventor: Hongyuan Xie, Shenzhen (CN)

(73) Assignee: SHENZHEN DANSHA TECHNOLOGY CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,541

(22) Filed: Jan. 24, 2018

(65) Prior Publication Data
US 2018/0167603 A1 Jun. 14, 2018

Related U.S. Application Data

(63) Continuation-in-part of application No. 15/132,518, filed on Apr. 19, 2016, now Pat. No. 9,967,542.

(51) Int. Cl.
| | |
|---|---|
| *G02B 6/124* | (2006.01) |
| *H04N 13/229* | (2018.01) |
| *G02B 6/12* | (2006.01) |
| *H04N 13/254* | (2018.01) |
| *G01B 11/24* | (2006.01) |
| *H04M 1/02* | (2006.01) |

(52) U.S. Cl.
CPC ........... *H04N 13/229* (2018.05); *G01B 11/24* (2013.01); *G02B 6/12* (2013.01); *G02B 6/124* (2013.01); *G02B 6/12004* (2013.01); *H04N 13/254* (2018.05); *G02B 2006/1215* (2013.01); *G02B 2006/12138* (2013.01); *G02B 2006/12147* (2013.01); *H04M 1/0202* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,110,203 A | * | 5/1992 | MacCabee | ............... G01S 17/89 356/5.04 |
| 9,967,542 B2 | * | 5/2018 | Xie | ........................ H04N 5/2256 |
| 2003/0048540 A1 | * | 3/2003 | Xie | ......................... A61B 3/102 359/637 |
| 2014/0066770 A1 | * | 3/2014 | Watanabe | ................ A61B 8/14 600/443 |

* cited by examiner

*Primary Examiner* — Behrooz M Senfi

(57) ABSTRACT

A system for three dimensional imaging includes: a light source; a modulator connected with the light source and configured to modulate output of the light source with a frequency sweep signal; an optical circuitry connected to the light source; a light sensor circuitry connected with the optical circuitry and configured to sense optical output of the optical circuitry and convert the optical output into a plurality of electrical signals; and a signal processing circuit connected with the light sensor circuitry and configured to extract 3D information of the object from the electrical signals. A mobile phone having the system and a method for three dimensional imaging are also provided.

20 Claims, 5 Drawing Sheets

SYSTEM AND METHOD FOR THREE DIMENSIONAL IMAGING

FIELD OF THE PATENT APPLICATION

The present patent application generally relates to imaging technologies and more specifically to a system and a method for three dimensional imaging.

BACKGROUND

Three dimensional (3D) imaging finds its application in a wide range of areas such as medical imaging, robotics, gesture recognition, face or body scanning for garment fitting, and so on. Compared with 2D imaging, 3D images contain depth information, which is useful for observing artifacts and structures in 3D, detecting structural defects, or evaluating goods without physical presence.

Mobile phones nowadays are usually equipped with high resolution cameras. Currently only 2D images can be taken by these cameras. As the mobile phone is a device that most people find comfortable to carry around, it is therefore desired to have a mobile phone equipped with a system for three dimensional imaging, by which a user can conveniently take high resolution 3D images that contain the depth information.

SUMMARY

The present patent application is directed to a system and a method for three dimensional imaging. In one aspect, the system for three dimensional imaging includes: a light source; a modulator connected with the light source and configured to modulate output of the light source with a frequency sweep signal; an optical circuitry connected to the light source; a light sensor circuitry connected with the optical circuitry and configured to sense optical output of the optical circuitry and convert the optical output into a plurality of electrical signals; and a signal processing circuit connected with the light sensor circuitry and configured to extract 3D information of the object from the electrical signals.

The optical circuitry may include: a first light splitter connected with the light source and configured to split light from the light source into a light output in a first optical path and a light output in a second optical path, the light output in the first optical path being directed to an object, passing through or being reflected by the object; a second light splitter connected with the first light splitter and configured to split the light output in the second optical path into a plurality of optical signals; a light coupler configured to collect light passing through or reflected by the object and couple the light to the light combining circuitry; and a light combining circuitry connected with the light coupler, the second light splitter, and the light sensor circuitry, including a plurality of light combiners, and configured to combine optical signals coupled from the light coupler and optical signals output by the second light splitter and output a plurality of combined optical signals.

The first light splitter may be a fiber optic fusion coupler. The light coupler may be a grating coupler that includes a matrix of pixels with m columns and n rows. The second light splitter may be a light splitter configured to split the light output in the second optical path into k optical signals, k=m×n. The light combining circuitry may include k light combiners, each light combiner being an optical Y-junction configured to combine an optical signal coupled from the light coupler and an optical signal output by the second light splitter and output a combined optical signal. The light sensor circuitry may include a matrix of k pixels, each pixel being a light sensor configured to convert the combined optical signal into an electrical signal.

The system for three dimensional imaging may further include an amplifier placed between the light source and the first light splitter and configured to amplify optical signal input to the first light splitter; and a collimator placed between the first light splitter and the object, and configured to collimate light before the light is directed to the object.

The optical circuitry and the light sensor circuitry may be integrated onto a silicon photonic chip fabricated with SOI processes. The light source, the modulator and the signal processing circuit may be further integrated onto the silicon photonic chip. The chip may include an optical sub-circuitry, the optical sub-circuitry integrating the light coupler and an image sensor.

The optical sub-circuitry may include a matrix of pixels. Each pixel may include a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

The refractive indexes of the air, the silicon waveguide layer and the glass layer may be n1, n2 and n3 respectively, while n2>n3>n1.

In another aspect, the present patent application provides a mobile phone including: a back cover on which a first window and a second window are defined; a light source; a modulator connected with the light source and configured to modulate output of the light source with a frequency sweep signal; a first light splitter connected with the light source and configured to split light from the light source into a light output in a first optical path and a light output in a second optical path, the light output in the first optical path being directed to an object, passing through or being reflected by the object; a second light splitter connected with the first light splitter and configured to split the light output in the second optical path into a plurality of optical signals; an optical sub-circuitry configured to collect light passing through or reflected by the object and couple the light to a light combining circuitry, the light combining circuitry being connected with the optical sub-circuitry and the second light splitter, including a plurality of light combiners, and configured to combine optical signals coupled from the optical sub-circuitry and optical signals output by the second light splitter and output a plurality of combined optical signals; a light sensor circuitry connected with the light combining circuitry and configured to sense optical output of the light combining circuitry and convert the optical output into a plurality of electrical signals; and a signal processing circuit connected with the light sensor circuitry and configured to extract 3D information of the object from the electrical signals. The first window is surrounding and aligned with the optical sub-circuitry. The second window is surrounding and aligned with the light output in the first optical path of the first light splitter.

The second window may be further surrounding and aligned with a flash light, the flash light being configured to provide assistive lighting for photo or video shooting with the mobile phone.

The optical sub-circuitry may include a matrix of pixels, which each pixel may include a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

In yet another aspect, the present patent application provides a method for three dimensional imaging that includes: splitting a modulated optical signal into a first optical path and a second optical path with a first splitter; reflecting light in the first optical path by an object or transmitting the light through the object; collecting the reflected or transmitted light with a predetermined number of pixels of a light coupler and coupling the predetermined number of collected optical signals to a light combining circuitry with the light coupler; splitting light in the second optical path to the predetermined number of split optical signals with a second light splitter; combining the predetermined number of collected optical signals and the predetermined number of split optical signals into the predetermined number of combined optical signals with the light combining circuitry; sensing the predetermined number of combined optical signals and converting the combined optical signals to electrical signals with a light sensor circuitry; and analyzing frequency of the electrical signals and determining 3D information of the object with a signal processing circuit.

The light coupler may be a grating coupler that includes a matrix of pixels with m columns and n rows, while the second light splitter may be a light splitter configured to split the light output in the second optical path into k optical signals, k=m×n.

The light combining circuitry may include k light combiners, each light combiner being an optical Y-junction configured to combine an optical signal coupled from the light coupler and an optical signal output by the second light splitter and output a combined optical signal.

The light sensor circuitry may include a matrix of k pixels, each pixel being a light sensor configured to convert the combined optical signal into an electrical signal.

BRIEF DESCRIPTIONS OF THE DRAWINGS

DETAILED DESCRIPTION

Reference will now be made in detail to a preferred embodiment of the system and the method for three dimensional imaging disclosed in the present patent application, examples of which are also provided in the following description. Exemplary embodiments of the system and the method for three dimensional imaging disclosed in the present patent application are described in detail, although it will be apparent to those skilled in the relevant art that some features that are not particularly important to an understanding of the system and the method for three dimensional imaging may not be shown for the sake of clarity.

Furthermore, it should be understood that the system and the method for three dimensional imaging disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
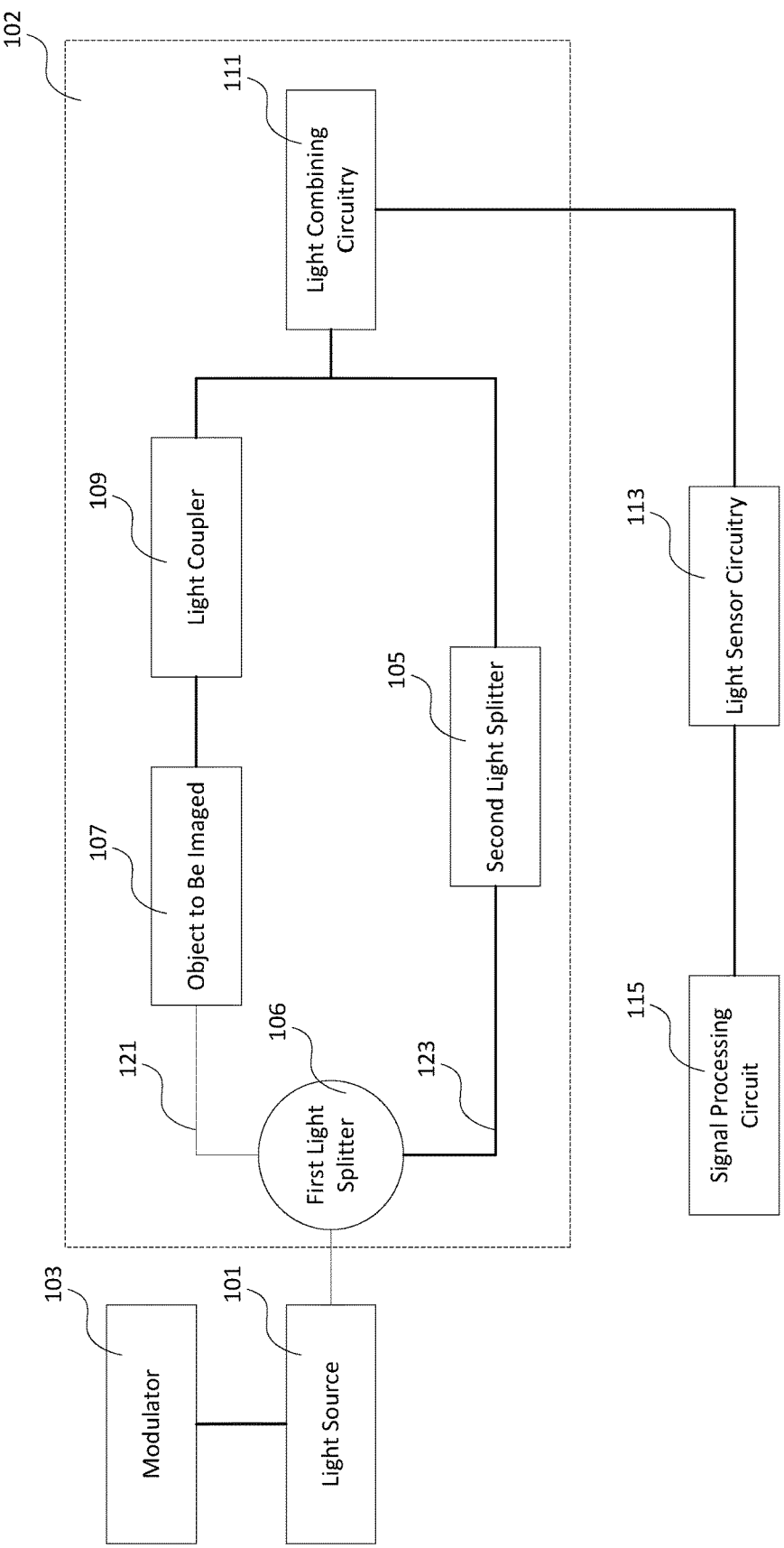
FIG. 1 is a block diagram of a system for three dimensional imaging in accordance with an embodiment of the present patent application.

FIG. 1 is a block diagram of a system for three dimensional imaging in accordance with an embodiment of the present patent application. Referring to FIG. 1, the system for three dimensional imaging includes a light source 101, a modulator 103 connected with the light source 101, an optical circuitry 102 connected to the light source 101, a light sensor circuitry 113 connected with the optical circuitry 102, and a signal processing circuit 115 connected with the light sensor circuitry 113.

Referring to FIG. 1, the optical circuitry 102 includes a first light splitter 106 connected with the light source 101, a second light splitter 105 connected with the first light splitter 106, a light coupler 109, and a light combining circuitry 111 connected with the light coupler 109, the second light splitter 105, and the light sensor circuitry 113.

In this embodiment, the light source 101 is a laser. The laser includes a VCSEL or a VCSEL array. The intensity of the output of the light source 101 is modulated by the modulator 103 with a frequency sweep signal v(t). In this embodiment, the frequency of the signal v(t) varies with time linearly during each sweep. The first light splitter 106 is a light splitter that is configured to split the modulated light output from the light source 101 into light outputs in two optical paths 121 and 123. As an example, the light splitter may be a fiber optic fusion coupler.

Referring to FIG. 1, the light output of the first light splitter 106 in the optical path 121 is directed to an object 107 to be imaged, passing through the object if the object 107 is transparent or being reflected by the object 107 if the object 107 is not transparent. In either case, light coming from the object 107 (i.e. light passing through the object 107 or light reflected by the object 107) is collected and coupled to the light combining circuitry 111 by the light coupler 109. In this embodiment, the light coupler 109 is a grating coupler that includes a matrix of pixels. The matrix has m columns and n rows, wherein m=600, n=800 in this embodiment as an example. So there are m×n=480,000 optical signals being coupled by the light coupler 109 to the light combining circuitry 111.

Referring to FIG. 1, the light output of the first light splitter 106 in the optical path 123 is coupled into the second light splitter 105. In this embodiment, the second light splitter 105 is a light splitter that is configured to split the light output into k optical signals, where k=m×n=480,000. The 480,000 optical signals output from the second light splitter 105 are guided into the light combining circuitry 111 and treated as reference signals.

The light combining circuitry 111 includes m×n=k=480,000 light combiners. Each light combiner, in this embodiment, is an optical Y-junction that is configured to combine an optical signal coupled from the light coupler 109 and an optical signal output by the second light splitter 105 and output the combined optical signal.

The combined optical signal output by each light combining circuitry in the light combining circuitry 111 is guided to a pixel of the light sensor circuitry 113. The light sensor circuitry 113 includes a matrix of pixels, each pixel in the matrix being a light sensor configured to convert the combined optical signal into an electrical signal, for example, a current signal i(t). In this embodiment, the matrix of pixels of the light sensor circuitry 113 includes m×n=k=480,000 pixels. The electrical signals output by the light sensor circuitry 113 are transmitted to the signal processing circuit 115. The signal processing circuit 115 is configured to extract 3D information of the object 107 from the electrical signals, which will be described in more detail hereafter.

According to another embodiment of the present patent application, an amplifier is placed between the light source 101 and the first light splitter 106, and configured to amplify the optical signal input to the first light splitter 106. The amplifier may be a fiber amplifier as an example. In the optical path 121, a collimator is placed between the first light splitter 106 and the object 107, and configured to collimate the light before the light is directed to the object 107.

In the above embodiments, the optical circuitry 102, which includes the first light splitter 106, the second light splitter 105, the light coupler 109, and the light combining circuitry 111, and the light sensor circuitry 113 are integrated onto a silicon photonic chip. Preferably, the silicon photonic chip is fabricated with SOI (silicon-on-insulator) processes.

The method that the signal processing circuit 115 uses to extract 3D information of the object 107 from the electrical signals output by the light sensor circuitry 113 is illustrated below. Referring to FIG. 1, the time delay difference $T_d$ between optical signals in the optical path 121 and the optical path 123 includes two components: the delay difference in the fiber $T_f$ and the delay difference outside of the fiber $T_O$. The delay difference inside the fiber $T_f$ is a constant over different pixels of the light coupler 109. The delay difference outside of the fiber $T_O$ depends on the specific pixel, and is in direct correlation with spatial information of the object 107, which includes the aforementioned depth information.

Consider any two light combining circuitrys $C_1$ and $C_2$ of the light combining circuitry 111, which correspond to two pixels of the light coupler 109 respectively. The time delay in the optical path 121 for the light combining circuitry $C_1$ is $D_{11}$, and the time delay in the optical path 123 for the light combining circuitry $C_1$ is $D_{12}$; while the time delay in the optical path 121 for the light combining circuitry $C_2$ is $D_{21}$, and the time delay in the optical path 123 for the light combining circuitry $C_2$ is $D_{22}$. The time delay difference between optical signals in the optical path 121 and the optical path 123 for one pixel (corresponding to the light combining circuitry $C_1$) is: $T_{d1}=D_{11}-D_{12}=T_{f1}+T_{O1}$, wherein $T_{f1}$ is the time delay difference inside the fiber for the pixel, and $T_{O1}$ is the time delay difference outside of the fiber for the pixel. The time delay difference between optical signals in the optical path 121 and the optical path 123 for the other pixel (corresponding to the light combining circuitry $C_2$) is: $T_{d2}=D_{21}-D_{22}=T_{f2}+T_{O2}$, wherein $T_{f2}$ is the time delay difference outside of the fiber for the other pixel, and $T_{O2}$ is the time delay difference outside of the fiber for the other pixel.

Because all optical signals in the optical paths 121 and 123 go through the same fiber setup regardless of the specific pixel positions, the time delay differences in the fiber $T_f$ for the two pixels are the same, i.e. $T_{f1}=T_{f2}$. However, if spatially related physical features, such as boundary, refractive index and etc., of the object 107 that correspond to the two pixels are different, the time delay differences outside of the fiber for the two pixels are different, i.e. $T_{O1} \neq T_{O2}$. In other words, $T_{d1}-T_{d2}=T_{O1}-T_{O2}$.

Hence, the variance in the time delay differences $T_d$ between the two optical paths 121 and 123 at different pixels contains the relative 3D spatial information of different pixel locations of the object 107. Such a variance further leads to different optical frequencies of the optical output of different light combiners, which in turn leads to different electrical frequencies of the electrical output of different pixels of the light sensor circuitry 113. By analyzing these different electrical frequencies, the relative 3D spatial information of the object 107 at different pixel locations can be determined and extracted.

Figure 2:
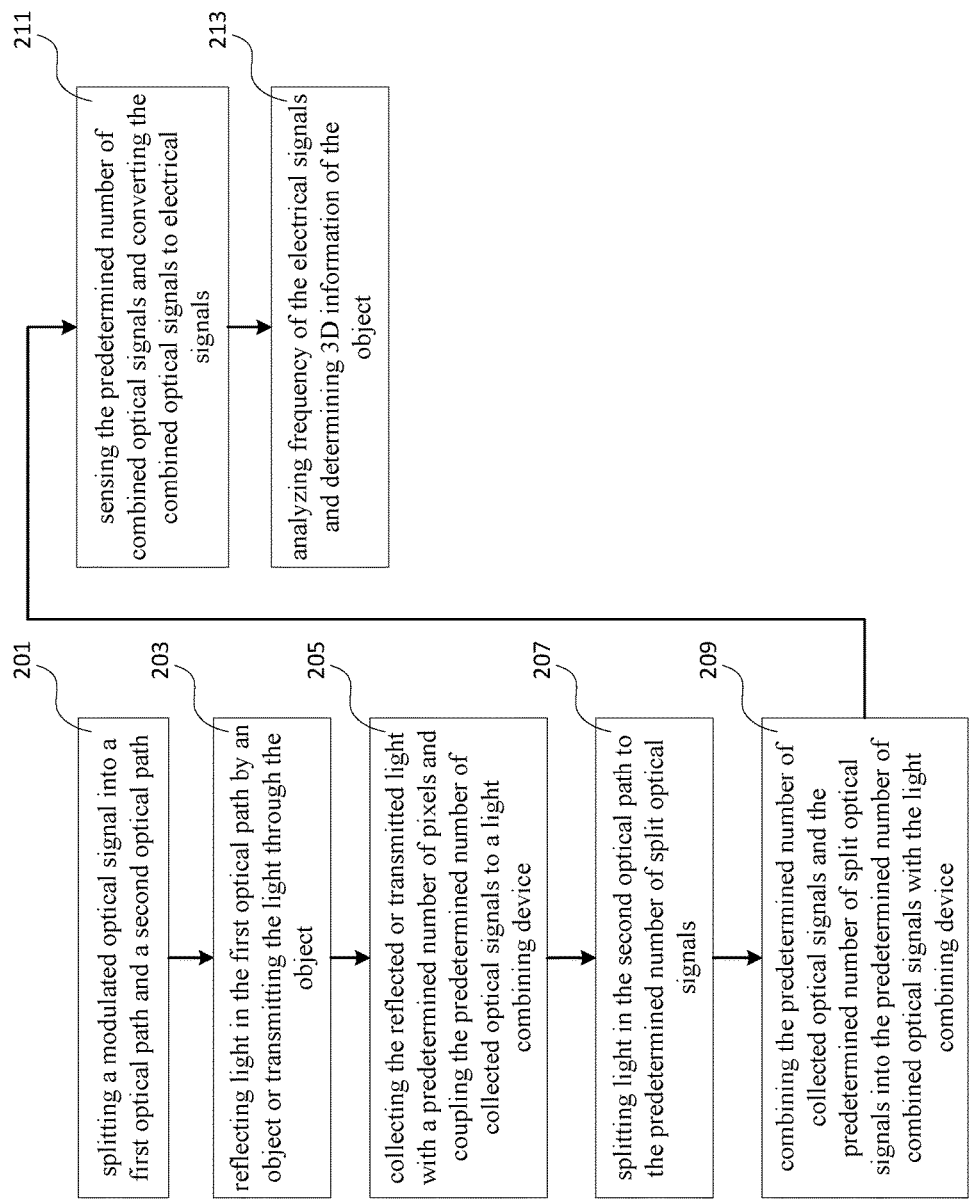
FIG. 2 is a flow chart illustrating a method for extracting 3D information of an object by the system for three dimensional imaging depicted in FIG. 1.

FIG. 2 is a flow chart illustrating a method for three dimensional imaging, and more specifically for extracting 3D information of an object by the system for three dimensional imaging depicted in FIG. 1. Referring to FIG. 2, the method includes: splitting a modulated optical signal into a first optical path and a second optical path (step 201); reflecting light in the first optical path by an object or transmitting the light through the object (step 203); collecting the reflected or transmitted light with a predetermined number of pixels and coupling the predetermined number of collected optical signals to a light combining circuitry (step 205); splitting light in the second optical path to the predetermined number of split optical signals (step 207); combining the predetermined number of collected optical signals and the predetermined number of split optical signals into the predetermined number of combined optical signals with the light combining circuitry (step 209); sensing the predetermined number of combined optical signals and converting the combined optical signals to electrical signals (step 211); and analyzing frequency of the electrical signals and determining 3D information of the object (step 213).

Figure 3A:
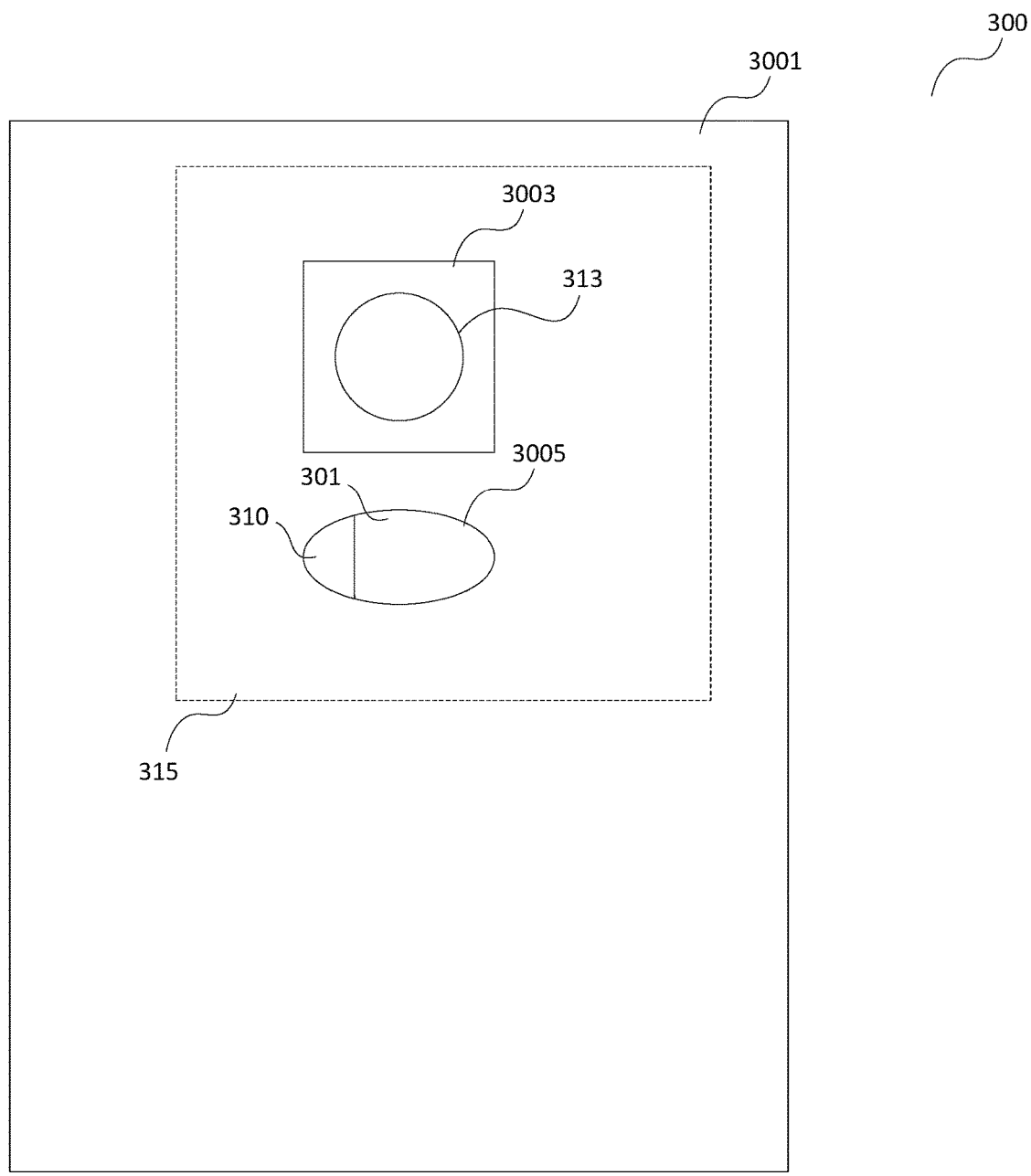
FIG. 3A is a back view of a mobile phone having a system for three dimensional imaging in accordance with another embodiment of the present patent application.

FIG. 3A is a back view of a mobile phone having a system for three dimensional imaging in accordance with another embodiment of the present patent application. Referring to FIG. 3A, a first window 3003 and a second window 3005 are defined in back cover 3001 of the mobile phone 300. The first window 3003 is surrounding and aligned with an optical sub-circuitry 313. In this embodiment, the optical sub-circuitry 313 integrates the light coupler 109 and an image sensor. The structure of the optical sub-circuitry 313 will be described in more detail hereafter. The second window 3005 is surrounding and aligned with a flash light 310 and a laser output 301. In this embodiment, the laser output 301 is the output of the first light splitter 106 (referring to FIG. 1) in the optical path 121. The flash light 310 is optional and configured to provide assistive lighting for photo or video shooting with the mobile phone 300. The system for three dimensional imaging, which includes all the elements in the embodiment illustrated by FIG. 1, is integrated on a silicon photonic chip 315, which is disposed underneath the back cover 3001. Preferably, the silicon photonic chip 315 is fabricated with SOI (silicon-on-insulator) processes.

Figure 3B:
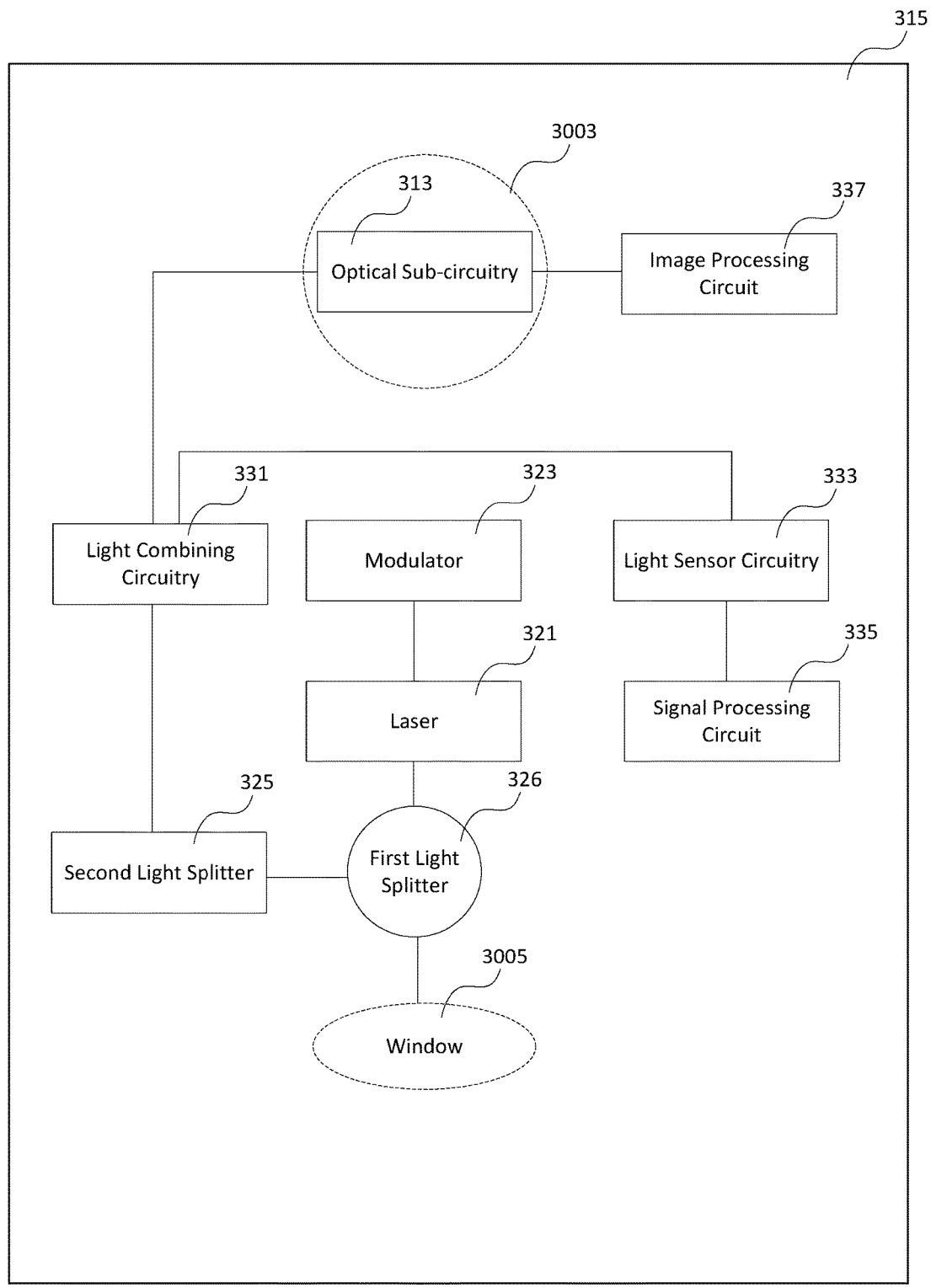
FIG. 3B illustrates a chip layout of the system for three dimensional imaging depicted in FIG. 3A.

FIG. 3B illustrates a chip layout of the system for three dimensional imaging depicted in FIG. 3A. Referring to FIG. 3B, the system for three dimensional imaging is integrated on the silicon photonic chip 315, which includes a laser 321, a modulator 323 connected with the laser 321, and a first light splitter 326 connected with the laser 321. The first light splitter 326 is an on chip light splitter with one output being projected out of the window 3005, and the other output being connected with a second light splitter 325, which is also integrated on the chip 315. The chip 315 further includes an optical sub-circuitry 313, which integrates the light coupler 109 and an image sensor. The optical sub-circuitry 313 is aligned with the window 3003. The chip 315 further includes a light combining circuitry 331. Optical signals coupled by the optical sub-circuitry 313 and optical signals output by the second light splitter 325 are fed to the light combining circuitry 331 and combined by the light combining circuitry 331. A light sensor circuitry 333 and a signal processing circuit 335 are connected to the light combining circuitry 331 and also integrated on the chip 315. As the optical sub-circuitry 313 integrates the image sensor, the chip 315 may further include an optional image processing circuit 337 connected to the optical sub-circuitry 313, and configured to process the image captured by the optical sub-circuitry 313.

Figure 4:
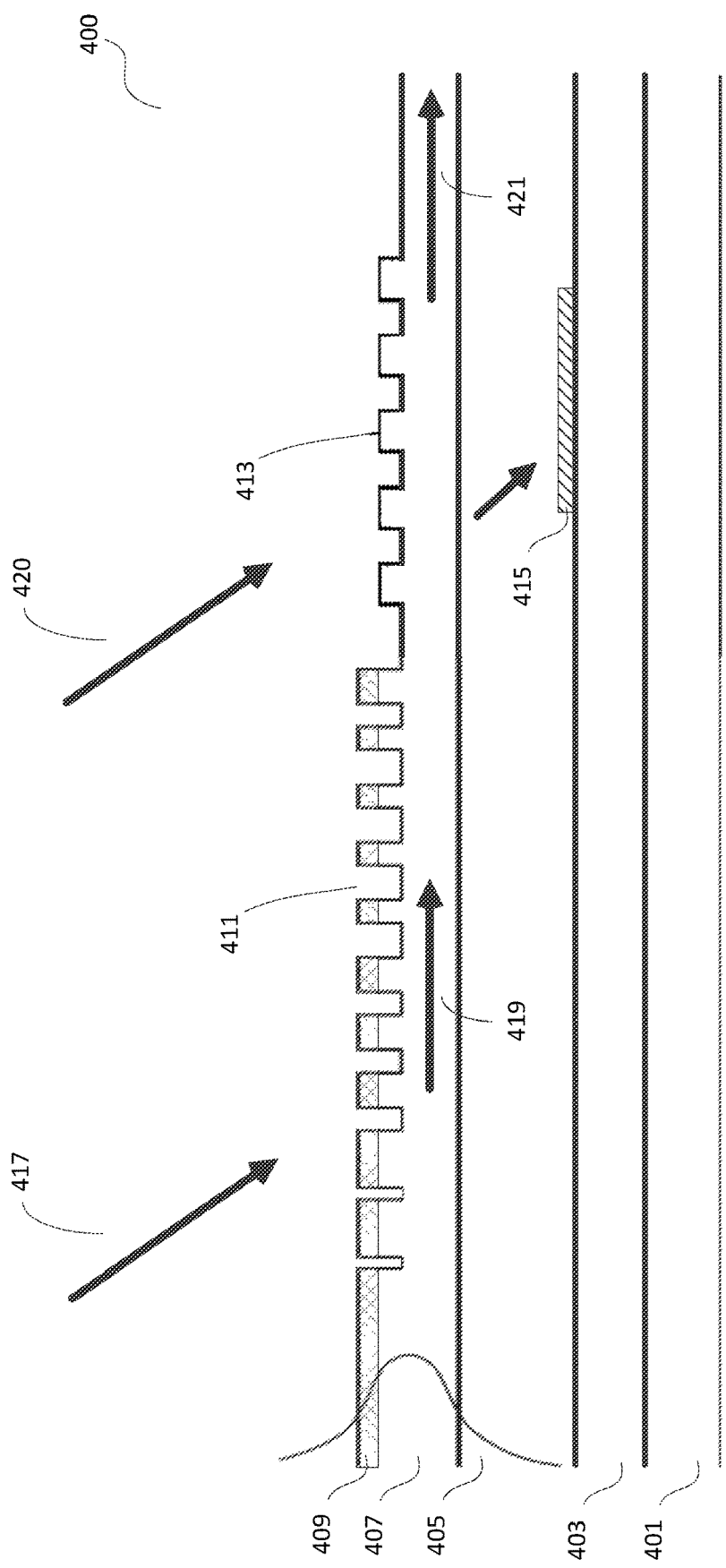
FIG. 4 is a partial cross-sectional view of an optical sub-circuitry of the mobile phone depicted in FIG. 3A.

FIG. 4 is a partial cross-sectional view of an optical sub-circuitry of the mobile phone depicted in FIG. 3A. The optical sub-circuitry 313 includes a matrix of pixels implemented on a silicon photonic chip. The matrix has m columns and n rows, wherein m=600, n=800 in this embodiment as an example. Each pixel includes a multi-layer structure. Referring to FIG. 4, a pixel 400 includes a silicon substrate layer 401, a silicon oxide layer 403 disposed on the silicon substrate layer 401, a glass layer 405 disposed on the silicon oxide layer 403, a silicon waveguide layer 407 disposed on the glass layer 405, and a polysilicon layer 409 partially covering the silicon waveguide layer 407. A plurality of teeth (i.e. gratings) 411 and 413 are formed in the silicon waveguide layer 407. As shown in FIG. 4, a part of the teeth (i.e. teeth 411) are covered by the polysilicon layer 409, while the other part of the teeth (i.e. teeth 413) are not covered by the polysilicon layer 409. A photodiode 415 is disposed on the silicon oxide layer 403 and covered by the glass layer 405.

Suppose the refractive indexes of the air, the silicon waveguide layer 407 and the glass layer 405 are n1, n2 and n3 respectively. In this embodiment, n2>n3>n1. Such a relationship ensures light is guided in a desired path in the optical sub-circuitry 313 as described in detail below.

Referring to FIG. 4, light (illustrated by the arrow 417) incident on the part of the pixel covered by the polysilicon layer 409 passes through the teeth 411 and thereby is coupled into the silicon waveguide layer 407, and transmitting along the silicon waveguide (illustrated by the arrow 419). When the light travels into the area below the teeth 413, a portion of the light is reflected by the teeth 413, entering the glass layer 405, and then collected by the photodiode 415. The remaining portion of the light stays propagating in the silicon waveguide layer 407, as illustrated by the arrow 421, and is guided to the a light combining circuitry of the light combining circuitry 111. It is noted that the light combining circuitry 111 is integrated to the same silicon photonic chip 315 as the optical sub-circuitry 313.

Light (illustrated by the arrow 420) incident on the part of the pixel not covered by the polysilicon layer 409 enters the teeth 413, passes through the silicon waveguide layer 407, enters the glass layer 405, and is collected by the photodiode 415. The light collected by the photodiode 415 of different pixels can be used to form an image of the object 107 so that the optical sub-circuitry 313 integrates not only the light coupler 109 but also an image sensor.

In this embodiment, the thickness of the polysilicon layer 409 may be adjusted to achieve the optimal directionality and coupling length of the gratings (i.e. teeth). The length and width variations of the gratings may be adjusted as well.

The system for three dimensional imaging provided by the aforementioned embodiments is fabricated on a single silicon photonic chip and hence can be integrated with a mobile phone with an assembly process that is not complicated nor expensive. In addition, the system for three dimensional imaging integrates the function of an imaging sensor, further reducing the manufacturing cost of the mobile phone having the system for three dimensional imaging and the complexity of its assembly process. Further, the mobile phone having the system for three dimensional imaging has a similar appearance as regular mobile phones and therefore is easy to use and customize according to users' habits of using regular mobile phones.

While the present patent application has been shown and described with particular references to a number of embodiments thereof, it should be noted that various other changes or modifications may be made without departing from the scope of the present invention.

What is claimed is:

1. A system for three dimensional imaging comprising:
   a light source;
   a modulator connected with the light source and configured to modulate output of the light source with a frequency sweep signal;
   an optical circuitry connected to the light source;
   a light sensor circuitry connected with the optical circuitry and configured to sense optical output of the optical circuitry and convert the optical output into a plurality of electrical signals; and
   a signal processing circuit connected with the light sensor circuitry and configured to extract 3D information of the object from the electrical signals.

2. The system for three dimensional imaging of claim 1, wherein the optical circuitry comprises:
   a first light splitter connected with the light source and configured to split light from the light source into a light output in a first optical path and a light output in a second optical path, the light output in the first optical path being directed to an object, passing through or being reflected by the object;
   a second light splitter connected with the first light splitter and configured to split the light output in the second optical path into a plurality of optical signals;
   a light coupler configured to collect light passing through or reflected by the object and couple the light to the light combining circuitry; and
   a light combining circuitry connected with the light coupler, the second light splitter, and the light sensor circuitry, comprising a plurality of light combiners, and configured to combine optical signals coupled from the light coupler and optical signals output by the second light splitter and output a plurality of combined optical signals.

3. The system for three dimensional imaging of claim 2, wherein the first light splitter is a fiber optic fusion coupler.

4. The system for three dimensional imaging of claim 2, wherein the light coupler is a grating coupler that comprises a matrix of pixels with m columns and n rows.

5. The system for three dimensional imaging of claim 4, wherein the second light splitter is a light splitter configured to split the light output in the second optical path into k optical signals, k=m×n.

6. The system for three dimensional imaging of claim 5, wherein the light combining circuitry comprises k light combiners, each light combiner being an optical Y-junction configured to combine an optical signal coupled from the light coupler and an optical signal output by the second light splitter and output a combined optical signal.

7. The system for three dimensional imaging of claim 6, wherein the light sensor circuitry comprises a matrix of k pixels, each pixel being a light sensor configured to convert the combined optical signal into an electrical signal.

8. The system for three dimensional imaging of claim 2 further comprising an amplifier placed between the light source and the first light splitter and configured to amplify optical signal input to the first light splitter; and a collimator placed between the first light splitter and the object, and configured to collimate light before the light is directed to the object.

9. The system for three dimensional imaging of claim 2, wherein the optical circuitry and the light sensor circuitry are integrated onto a silicon photonic chip fabricated with SOI processes.

10. The system for three dimensional imaging of claim 9, wherein the light source, the modulator and the signal processing circuit are further integrated onto the silicon photonic chip.

11. The system for three dimensional imaging of claim 10, wherein the chip comprises an optical sub-circuitry, the optical sub-circuitry integrating the light coupler and an image sensor.

12. The system for three dimensional imaging of claim 11, wherein the optical sub-circuitry comprises a matrix of pixels, while each pixel comprises a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

13. The system for three dimensional imaging of claim 12, wherein the refractive indexes of the air, the silicon waveguide layer and the glass layer are n1, n2 and n3 respectively, while n2>n3>n1.

14. A mobile phone comprising:
a back cover on which a first window and a second window are defined;
a light source;
a modulator connected with the light source and configured to modulate output of the light source with a frequency sweep signal;
a first light splitter connected with the light source and configured to split light from the light source into a light output in a first optical path and a light output in a second optical path, the light output in the first optical path being directed to an object, passing through or being reflected by the object;
a second light splitter connected with the first light splitter and configured to split the light output in the second optical path into a plurality of optical signals;
an optical sub-circuitry configured to collect light passing through or reflected by the object and couple the light to a light combining circuitry, the light combining circuitry being connected with the optical sub-circuitry and the second light splitter, comprising a plurality of light combiners, and configured to combine optical signals coupled from the optical sub-circuitry and optical signals output by the second light splitter and output a plurality of combined optical signals;
a light sensor circuitry connected with the light combining circuitry and configured to sense optical output of the light combining circuitry and convert the optical output into a plurality of electrical signals; and
a signal processing circuit connected with the light sensor circuitry and configured to extract 3D information of the object from the electrical signals; wherein:
the first window is surrounding and aligned with the optical sub-circuitry; and
the second window is surrounding and aligned with the light output in the first optical path of the first light splitter.

15. The mobile phone of claim 14, wherein the second window is further surrounding and aligned with a flash light, the flash light being configured to provide assistive lighting for photo or video shooting with the mobile phone.

16. The mobile phone of claim 14, wherein the optical sub-circuitry comprises a matrix of pixels, while each pixel comprises a silicon substrate layer, a silicon oxide layer disposed on the silicon substrate layer, a glass layer disposed on the silicon oxide layer, a silicon waveguide layer disposed on the glass layer, and a polysilicon layer partially covering the silicon waveguide layer, a plurality of teeth being formed in the silicon waveguide layer, a photodiode being disposed on the silicon oxide layer and covered by the glass layer.

17. A method for three dimensional imaging comprising:
splitting a modulated optical signal into a first optical path and a second optical path with a first splitter;
reflecting light in the first optical path by an object or transmitting the light through the object;
collecting the reflected or transmitted light with a predetermined number of pixels of a light coupler and coupling the predetermined number of collected optical signals to a light combining circuitry with the light coupler;
splitting light in the second optical path to the predetermined number of split optical signals with a second light splitter;
combining the predetermined number of collected optical signals and the predetermined number of split optical signals into the predetermined number of combined optical signals with the light combining circuitry;
sensing the predetermined number of combined optical signals and converting the combined optical signals to electrical signals with a light sensor circuitry; and
analyzing frequency of the electrical signals and determining 3D information of the object with a signal processing circuit.

18. The method of claim 17, wherein the light coupler is a grating coupler that comprises a matrix of pixels with m columns and n rows, while the second light splitter is a light splitter configured to split the light output in the second optical path into k optical signals, k=m×n.

19. The method of claim 18, wherein the light combining circuitry comprises k light combiners, each light combiner being an optical Y-junction configured to combine an optical signal coupled from the light coupler and an optical signal output by the second light splitter and output a combined optical signal.

20. The method of claim 19, wherein the light sensor circuitry comprises a matrix of k pixels, each pixel being a light sensor configured to convert the combined optical signal into an electrical signal.

* * * * *